United States Patent
Chen et al.

(10) Patent No.: US 12,219,412 B2
(45) Date of Patent: Feb. 4, 2025

(54) METHOD FOR REPORTING STATE INFORMATION, TERMINAL, AND NETWORK DEVICE

(71) Applicant: VIVO MOBILE COMMUNICATION CO., LTD., Guangdong (CN)

(72) Inventors: Li Chen, Guangdong (CN); Wei Bao, Guangdong (CN); Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 409 days.

(21) Appl. No.: 17/668,642

(22) Filed: Feb. 10, 2022

(65) Prior Publication Data

US 2022/0272585 A1    Aug. 25, 2022

Related U.S. Application Data

(63) Continuation of application No. PCT/CN2020/109221, filed on Aug. 14, 2020.

(30) Foreign Application Priority Data

Aug. 14, 2019   (CN) .......................... 201910750380.3

(51) Int. Cl.
*H04W 4/00*     (2018.01)
*H04W 36/00*    (2009.01)
*H04W 36/36*    (2009.01)

(52) U.S. Cl.
CPC ...... *H04W 36/0064* (2023.05); *H04W 36/362* (2023.05)

(58) Field of Classification Search
CPC ............. H04W 36/0055; H04W 36/08; H04W 36/362; H04W 36/0058; H04W 36/0064;
(Continued)

(56) References Cited

U.S. PATENT DOCUMENTS

2016/0277987 A1   9/2016  Chen et al.
2018/0049082 A1   2/2018  Kinthada Venkata et al.
(Continued)

FOREIGN PATENT DOCUMENTS

CN    101938757 A    1/2011
CN    101969662 A    2/2011
(Continued)

OTHER PUBLICATIONS

CATT, "Discussion on Mobility Robust Optimization in 5G system", 3GPP TSG-RAN WG3 #103bis, Xi'an, China, Apr. 8-12, 2019, 6 pages.
(Continued)

*Primary Examiner* — Thai Dinh Hoang
(74) *Attorney, Agent, or Firm* — Price Heneveld LLP

(57) ABSTRACT

A method for reporting state information, a terminal, and a network device are provided. The method for reporting state information includes transmitting state information, by the terminal, of a handover procedure to the network device,
(Continued)

where the state information of a handover procedure includes at least one of the following: random access procedure state information corresponding to a handover target cell of the handover procedure; connection failure information corresponding to a handover target cell of the handover procedure; and RLF information in the handover procedure.

18 Claims, 3 Drawing Sheets

(58) Field of Classification Search
CPC .............. H04W 36/0079; H04W 24/02; H04W 36/0066; H04W 36/0077
See application file for complete search history.

(56) References Cited

U.S. PATENT DOCUMENTS

| | | | |
|---|---|---|---|
| 2019/0223073 A1* | 7/2019 | Chen | H04W 36/0079 |
| 2019/0268812 A1 | 8/2019 | Li et al. | |
| 2020/0045602 A1 | 2/2020 | Jiang | |
| 2021/0051550 A1* | 2/2021 | Latheef | H04L 41/0816 |
| 2021/0385703 A1* | 12/2021 | Park | H04W 36/0083 |
| 2022/0191748 A1* | 6/2022 | Viering | H04W 36/08 |
| 2022/0201582 A1* | 6/2022 | Ekl?f | H04W 36/00837 |
| 2022/0217597 A1* | 7/2022 | Ishii | H04W 36/00838 |
| 2022/0264394 A1 | 8/2022 | Wang | |
| 2022/0272585 A1* | 8/2022 | Chen | H04W 36/0064 |
| 2022/0272589 A1* | 8/2022 | Ishii | H04W 36/00837 |
| 2022/0330114 A1* | 10/2022 | Uchino | H04W 36/305 |
| 2022/0369171 A1* | 11/2022 | Kim | H04W 36/0011 |
| 2022/0377630 A1* | 11/2022 | Wu | H04W 36/0079 |
| 2022/0386197 A1* | 12/2022 | Hwang | H04W 36/0072 |
| 2022/0408323 A1* | 12/2022 | Ishii | H04W 36/362 |
| 2023/0388871 A1* | 11/2023 | Guo | H04W 36/0069 |
| 2023/0422137 A1* | 12/2023 | Wu | H04W 76/20 |

FOREIGN PATENT DOCUMENTS

| | | | | |
|---|---|---|---|---|
| CN | 102281572 A | 12/2011 | | |
| CN | 103581999 A | 2/2014 | | |
| CN | 107113673 A | 8/2017 | | |
| CN | 107690162 A | 2/2018 | | |
| CN | 108076488 A | 5/2018 | | |
| EP | 2955962 A1 | 12/2015 | | |
| JP | 2021510272 A | 4/2021 | | |
| JP | 2022546907 A | 11/2022 | | |
| WO | WO-2018188078 A1 * | 10/2018 | ............ | H04B 17/318 |
| WO | WO-2022211340 A1 * | 10/2022 | ............ | H04W 36/00 |
| WO | WO-2024096801 A1 * | 5/2024 | ............ | H04W 24/10 |

OTHER PUBLICATIONS

TCL, "Mobility enhancement mechanism for 0ms interruption handover in NR", 3GPP TSG-RAN2#101, R2-1801937, Athens, Greece, Feb. 26-Mar. 2, 2018.

ZTE Corp., "Discussion on single connected handover", 3GPP TSG-RAN WG2 NR Ad hoc 0118, R2-1800438, Vancouver, Canada, Jan. 22-Jan. 26, 2018.

VIVO, "Discussion on the RLF and HOF during non-split bearer handover," 3GPP TSG-RAN WG2 Meeting #105bis R2-1903811, Xi'an, China, Apr. 8-Apr. 12, 2019 revision of R2-1900505 (8 pages).

Ericsson, "Discussion on Mobility Robustness Optimization in 5G system," 3GPP TSG-RAN WG3 #104 R3-193186 Reno, Nevada May 13-May 17, 2019 (7 pages).

* cited by examiner

METHOD FOR REPORTING STATE INFORMATION, TERMINAL, AND NETWORK DEVICE

CROSS-REFERENCE TO RELATED APPLICATIONS

This application is a continuation application of International Application No. PCT/CN2020/109221 filed on Aug. 14, 2020, which claims priority to Chinese Patent Application No. 201910750380.3, filed in China on Aug. 14, 2019, which are incorporated herein by reference in their entireties.

TECHNICAL FIELD

The present disclosure relates to the field of communications technologies, and in particular, to a method for reporting state information, a terminal, and a network device.

BACKGROUND

In conventional technology, a handover procedure means an attempt to hand over to a candidate cell. For a self-organizing network (SON) or minimization of drive tests (MDT), a terminal needs to report the following information: information related to a last successful random access procedure (RACH), radio link failure (RLF) report, and failure types. Based on such information, a network device can perform related configuration operation.

In order to adapt to the development of communication technologies, in conventional technology, the terminal may perform a handover procedure involving multiple attempts of handover to a plurality of candidate cells, such as a conditional handover (CHO) procedure. However, after the introduction of the handover procedure involving multiple attempts of handover to a plurality of candidate cells, how the terminal reports state information of a handover procedure in conventional technology cannot meet a configuration requirement of the network device.

SUMMARY

Embodiments of this disclosure provide a method for reporting state information, a terminal, and a network device.

In order to resolve the foregoing technical problem, the embodiments of this disclosure are implemented as follows:

According to a first aspect, an embodiment of this disclosure provides a method for reporting state information, applied to a terminal and including:
  transmitting state information of a handover procedure to a network device, where the state information of a handover procedure includes at least one of the following:
  random access procedure state information corresponding to a handover target cell of the handover procedure;
  connection failure information corresponding to a handover target cell of the handover procedure; and
  RLF information in the handover procedure.

According to a second aspect, an embodiment of this disclosure provides a method for reporting state information, applied to a network device and including:
  receiving state information of a handover procedure from a terminal, where the state information of a handover procedure includes at least one of the following:
  random access procedure state information corresponding to a handover target cell of the handover procedure;
  connection failure information corresponding to a handover target cell of the handover procedure; and
  RLF information in the handover procedure.

According to a third aspect, an embodiment of this disclosure provides a terminal, including:
  a first transmitting module, configured to transmit state information of a handover procedure to a network device, where
  the state information of a handover procedure includes at least one of the following:
  random access procedure state information corresponding to a handover target cell of the handover procedure;
  connection failure information corresponding to a handover target cell of the handover procedure; and
  RLF information in the handover procedure.

According to a fourth aspect, an embodiment of this disclosure provides a network device, including:
  a receiving module, configured to receive state information of a handover procedure from a terminal, where
  the state information of a handover procedure includes at least one of the following:
  random access procedure state information corresponding to a handover target cell of the handover procedure;
  connection failure information corresponding to a handover target cell of the handover procedure; and
  RLF information in the handover procedure.

According to a fifth aspect, an embodiment of this disclosure provides a communications device, including a memory, a processor, and a computer program stored in the memory and capable of running on the processor, where when the computer program is executed by the processor, the steps of the foregoing method for reporting state information are implemented. The communications device is optionally a terminal or a network device.

According to a sixth aspect, an embodiment of this disclosure provides a computer-readable storage medium, where a computer program is stored in the computer-readable storage medium. When the computer program is executed by a processor, the steps of the foregoing method for reporting state information are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following descriptions show only some embodiments of this disclosure, and a person of ordinary skill in the art may still derive other drawings from these accompanying drawings without creative efforts.

DETAILED DESCRIPTION OF EMBODIMENTS

Figure 1:
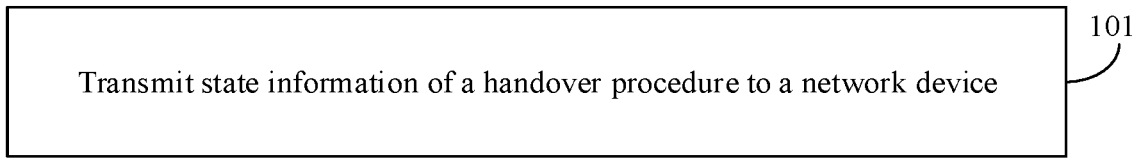
FIG. 1 is a flowchart of a method for reporting state information according to an embodiment of this disclosure.

To describe the technical solutions in the embodiments of this disclosure more clearly, the following briefly describes the accompanying drawings required for describing the embodiments of this disclosure. Apparently, the accompanying drawings in the following descriptions show only some embodiments of this disclosure, and a person of ordinary skill in the art may still derive other drawings from these accompanying drawings without creative efforts.

The technologies described herein are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably. The CDMA system can implement radio technologies such as CDMA2000 and universal terrestrial radio access (UTRA). UTRA includes wideband CDMA (WCDMA) and other CDMA variants. The TDMA system can implement radio technologies such as global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are part of the universal mobile telecommunications system (UMTS). LTE and more advanced LTEs (such as LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described herein are applicable not only to the above-mentioned systems and radio technologies, but also to other systems and radio technologies.

A wireless communication system in the embodiments of this disclosure includes a terminal and a network device. The terminal may also be referred to as a terminal device or user equipment (UE). The terminal may be a terminal side device such as a mobile phone, a tablet computer, a laptop computer, a personal digital assistant (PDA), a mobile Internet device (MID), a wearable device, or an in-vehicle device. It should be noted that the specific type of the terminal is not limited in the embodiments of this disclosure. The network device may be a base station or a core network. The base station may be a 5G base station or a base station of a later release (for example, a gNB or a 5G NR NB), or base stations in other communications systems (for example, eNB, WLAN access point, or other access points). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or other applicable terms in the art. As long as a same technical effect is achieved, the base station is not limited to any specific technical term.

For ease of understanding of the embodiments of this disclosure, the following describes a conditional handover procedure CHO first.

Specifically, a CHO procedure may mainly include the following steps:

S1: A source node transmits handover request information to one or a plurality of target nodes.

S2: The target node feeds back handover acknowledgment information to the source node.

S3: The source node transmits conditional handover configuration information to a terminal such as user equipment (UE).

S4: The UE evaluates whether a candidate cell satisfies a condition, and if the condition is met, select a target cell for handover.

S5: The UE initiates a random access procedure in the selected target cell.

S6: The UE transmits handover complete information to the target node.

S7: The source node transmits a conditional handover cancellation command to another target node.

S8. The another target node transmits a conditional handover cancellation acknowledgment command to the source node.

Optionally, the handover procedure in the embodiments of this disclosure may be a normal handover procedure involving multiple attempts of handover to a plurality of candidate cells, or may be a CHO involving multiple attempts of handover to a plurality of candidate cells.

Referring to FIG. 1, FIG. 1 is a flowchart of a method for reporting state information according to an embodiment of this disclosure. The method is applied to a terminal. As shown in FIG. 1, the method includes the following steps:

Step 101: Transmit state information of a handover procedure to a network device.

Optionally, the state information of a handover procedure may include at least one of the following:

random access procedure state information corresponding to a handover target cell of the handover procedure;

connection failure information corresponding to a handover target cell of the handover procedure; and RLF information in the handover procedure, which is RLF information before an attempt to connect to the target cell.

The handover target cell may be construed as a handover command corresponding to the handover target cell, for example, a CHO command.

In an embodiment, in a case that the handover produce in this embodiment is a CHO, the state information of the CHO reported by the terminal may include at least one of the following:

random access procedure state information corresponding to a handover target cell of the CHO procedure (or CHO command corresponding to the handover target cell);

connection failure information corresponding to a handover target cell of the CHO procedure (or CHO command corresponding to the handover target cell); and RLF information in the CHO procedure.

Optionally, the random access procedure state information may include at least one of the following:

random access procedure failure information; and random access procedure success information.

Optionally, the connection failure information may include at least one of the following:

RLF information, handover failure information, and re-establishment failure information.

The RLF information may include at least one of the following:

handover stage information corresponding to an RLF, where the handover stage information may be selected before a trigger condition is satisfied, after a trigger condition is satisfied, or after a successful access to the target cell;

a measurement result, where the measurement result is a measurement result of at least one of a local cell, a candidate cell, and a neighboring cell; and the neighboring cell may be an intra-frequency neighboring cell, an inter-frequency neighboring cell, and/or an inter-RAT neighboring cell; and at least one of a cell identity (Cell ID), a cell group identity (Cell group ID), and a frequency identity (frequency ID) corresponding to the RLF. The cell identity may be a physical cell identity (PCI), and/or a cell global identity (CGI). The frequency identity may be at least one of the following: carrier identity, bandwidth identity, and frequency band identity.

In the method for reporting state information in this embodiment of this disclosure, a terminal can transmit state information of a handover procedure to a network device, where the state information of a handover procedure may include random access procedure state information corresponding to a handover target cell of the handover procedure, connection failure information corresponding to a handover target cell of the handover procedure, and/or RLF information in the handover procedure. Compared with a reporting manner in conventional technology, using this embodiment of this disclosure, the terminal can effectively report the state information of a related handover procedure, meeting a configuration requirement of the network device even after the introduction of a handover procedure involving multiple attempts of handover to a plurality of candidate cells, so that the network device can optimize related configuration based on information reported by the terminal.

In this embodiment of this disclosure, optionally, the random access procedure failure information may include at least one of the following:

(1) a quantity of one or a plurality of handover attempts;
(2) a quantity of one or a plurality of handover failures;
(3) a quantity of handover attempts corresponding to a final successful access in one or a plurality of handover attempts;
(4) a quantity of one or a plurality of re-establishment attempts;
(5) a quantity of one or a plurality of re-establishment failures;
(6) a quantity of re-establishment attempts corresponding to a final successful access in one or a plurality of re-establishment attempts;
(7) a quantity of a plurality of handover attempts and re-establishment attempts;
(8) a quantity of a plurality of handover failures and re-establishment failures;
(9) a quantity of handover attempts or re-establishment attempts corresponding to a final successful access in a plurality of handover attempts or re-establishment attempts;
(10) target information corresponding to one or a plurality of handover failures;
(11) target information corresponding to one or a plurality of re-establishment failures;
(12) a quantity of selections of handover to a candidate cell in one or a plurality of re-establishments;
(13) at least one of a measurement result, a cell identity (Cell ID), a cell group identity (Cell group ID), and a frequency identity (frequency ID) that correspond to each selection of handover to a candidate cell in one or a plurality of re-establishments;
(14) time related information, for example, time information at occurrence of a connection failure, such as timeConnFailure; and
(15) location related information, for example, location information of the terminal at failure of the current handover or re-establishment.

It should be noted that the quantity in the foregoing (1) may be construed as a total quantity of handover attempts by the terminal, for example, N. It should be noted that the quantity in the foregoing (2) may be construed as a total quantity of handover failures of the terminal, for example, N. It should be noted that the quantity of handover attempts in the foregoing (3) may be construed as an ordinal number of a handover attempt corresponding to the final successful access, for example, the (N+1)-th handover attempt. Scenarios corresponding to the foregoing (1) to (3) may be that the terminal makes only handover attempts, for example, conditional handover CHO attempts.

It should be noted that the quantity in the foregoing (4) may be construed as a total quantity of re-establishment (Re-est) attempts by the terminal. It should be noted that the quantity in the foregoing (5) may be construed as a total quantity of re-establishment failures of the terminal. It should be noted that the quantity of re-establishment attempts in the foregoing (6) may be construed as an ordinal number of a re-establishment attempt corresponding to the final successful access. Scenarios corresponding to the foregoing (4) to (6) may be that the terminal makes only re-establishment attempts.

It should be noted that the quantity in the foregoing (7) may be construed as a total quantity of handover attempts and re-establishment attempts by the terminal. It should be noted that the quantity in the foregoing (8) may be construed as a total quantity of handover failures and re-establishment failures of the terminal. It should be noted that in the foregoing (9), the quantity of handover attempts may be construed as an ordinal number of a handover attempt corresponding to the final successful access, and the quantity of re-establishment attempts may be construed as an ordinal number of a re-establishment attempt corresponding to the final successful access. Scenarios corresponding to the foregoing (7) to (9) may be that the terminal makes only re-establishment attempts, or may be that the terminal makes both handover attempts (for example, CHO attempts) and re-establishment attempts. For example, a handover procedure performed by the terminal may further include: CHO1, CHO2, CHO3, CHO4, and Re-est1; if a candidate cell is successfully accessed at Re-est1, the quantity of handover attempts and re-establishment attempts is 5, the quantity of handover failures is 4, and the ordinal number of a re-establishment attempt corresponding to the final successful access is 1st.

The target information in the foregoing (10) to (11) may include but is not limited to at least one of the following:

a measurement result, where the measurement result is a measurement result of at least one of a local cell, a candidate cell, and a neighboring cell; and the neighboring cell may be an intra-frequency neighboring cell, an inter-frequency neighboring cell, and/or an inter-RAT neighboring cell;

at least one of a cell identity (Cell ID), a cell group identity (Cell group ID), and a frequency identity (frequency ID), where the cell identity may be PCI, and/or a cell global ID, and the frequency identity may be at least one of the following: carrier identity, bandwidth identity, and frequency band (frequency band) identity; and a random access contention (RACH contention) detection result, where the detection result may be information indicating whether random access contention is detected.

Optionally, the measurement result may be any one of the following:

a measurement result at triggering a handover, where the measurement result may be the latest measurement result; and a measurement result at satisfaction of a trigger condition for determining a handover failure.

The measurement result in the foregoing (13) may be a measurement result of at least one of a local cell, a candidate cell, and a neighboring cell; and the neighboring cell may be an intra-frequency neighboring cell, an inter-frequency neighboring cell, and/or an inter-RAT neighboring cell. The frequency identity in the foregoing (13) may be at least one of the following: carrier identity, bandwidth identity, and frequency band identity.

Optionally, the measurement result in this embodiment of this disclosure may include at least one of the following:

reference signal received power (RSRP);
reference signal received quality (RSRQ); and
signal to interference plus noise ratio (INR);

Further, the random access procedure failure information in this embodiment of this disclosure may further include at least one of the following:

(16) a trigger condition corresponding to one or a plurality of handover failures;

(17) a trigger condition index corresponding to one or a plurality of handover failures;

(18) a trigger condition corresponding to one or a plurality of re-establishment failures; and

(19) a trigger condition index corresponding to one or a plurality of re-establishment failures.

The trigger condition in the foregoing (16) may be a trigger condition corresponding to each handover failure, or may be a trigger condition corresponding to a last handover failure before a successful access. The trigger condition in the foregoing (17) may be a trigger condition index corresponding to each handover failure, or may be a trigger condition index corresponding to a last handover failure before a successful access. The trigger condition in the foregoing (18) may be a trigger condition corresponding to each re-establishment failure, or may be a trigger condition corresponding to a last re-establishment failure before a successful access. The trigger condition in the foregoing (19) may be a trigger condition index corresponding to each re-establishment failure, or may be a trigger condition index corresponding to a last re-establishment failure before a successful access.

In the foregoing (16) to (19), the one may include any one of the following:

only one attempt, any one attempt, and the last attempt before a successful access; and/or the plurality may include any one of the following:

all handover and re-establishment attempts, all handover attempts, and all re-establishment attempts.

In this embodiment of this disclosure, optionally, the random access procedure success information may include at least one of the following:

a quantity of transmissions of a preamble of a final successful random access procedure;

a contention detection result of a final successful random access;

at least one of a trigger condition, a measurement result, a cell identity, a cell group identity, and a frequency identity that correspond to a successful handover;

at least one of a trigger condition, a measurement result, a cell identity, a cell group identity, and a frequency identity that correspond to a successful re-establishment;

a quantity of a plurality of handover attempts before a successful random access;

a quantity of a plurality of re-establishment attempts before a successful random access;

a quantity of a plurality of handover attempts and re-establishment attempts before a successful random access;

at least one of a trigger condition, a measurement result, a cell identity, a cell group identity, and a frequency identity that correspond to each handover attempt before a successful random access; and at least one of a measurement result, a cell identity, a cell group identity, and a frequency identity that correspond to each re-establishment attempt before a successful random access.

It can be understood that the measurement result contained in the random access procedure success information may be a measurement result of at least one of a corresponding local cell, candidate cell, and neighboring cell; and the neighboring cell may be an intra-frequency neighboring cell, an inter-frequency neighboring cell, and/or an inter-RAT neighboring cell. The frequency identity may be at least one of the following: carrier identity, bandwidth identity, and frequency band identity.

In this embodiment of this disclosure, in a case that the state information of a handover procedure reported by the terminal includes a trigger condition (for example, a trigger condition corresponding to a handover attempt or a trigger condition corresponding to a handover failure), the state information of a handover procedure may further include: effective range information corresponding to the trigger condition.

The effective range information corresponding to the trigger condition may include an effective range identity (ID). The effective range information corresponding to the trigger condition can help a network device (NW) to determine an effective range configured for the trigger condition.

In an embodiment, if a trigger condition 1 corresponds to successful CHO in cell 1 and cell 2, but corresponds to unsuccessful CHO in cell 3, the network device can configure the effective range for the trigger condition 1 as cell 1 and cell 2.

In this embodiment of this disclosure, in a case that the terminal has a connection failure, the state information of a handover procedure may further include: connection failure timing information.

Optionally, the connection failure timing information may include any one of the following:

(1) duration from start of execution of a target handover command to failure of establishing a connection to a target cell corresponding to the target handover command. This means that the terminal may report different connection failure timing information for different target handover commands. If the target handover command is a CHO command, the from start of execution of a target handover command means from satisfaction of a trigger condition corresponding to the CHO command.

For example, if the target handover command indicates a handover to cell 1, the corresponding connection failure timing information may be duration from start of the handover to cell 1 to a failure of handover to cell 1.

(2) duration from triggering a handover procedure for the first time to failure of establishing a connection to a target cell corresponding to a target handover command. This means that the terminal may report different connection failure timing information for different target handover commands.

For example, in the case of triggering a handover to cell 1 for the first time, if the target handover command indicates a handover to cell 4, the corresponding connection failure timing information may be duration from the triggering a handover to cell 1 for the first time to a failure of handover to cell 4, where handover to cell 1 and cell 3 may have been attempted between the attempts of handover to cell 1 and cell 4.

(3) duration from receipt of a target handover command to failure of establishing a connection to a target cell corresponding to the target handover command. This means that the terminal may report different connection failure timing information for different target handover commands.

The target handover command in the foregoing (1) to (3) may be referred as a specific handover command. The target handover command may be any one of the following:

the first triggered handover command; for example, the first triggered CHO command, that is, satisfaction of a condition for CHO for the first time;

a handover command corresponding to a candidate cell for a current handover or re-establishment;

a handover command corresponding to a last candidate cell for handover or re-establishment before a successful handover to a candidate cell; and a handover command corresponding to a last candidate cell for handover or re-establishment before a successful re-establishment to a candidate cell or another cell.

In this embodiment of this disclosure, the terminal reporting the state information of a handover procedure may be triggered by a request of the network device, or may be triggered by a situation of the terminal. Optionally, step 101 may include:

transmitting the state information of a handover procedure to the network device in a case that any one of the following is satisfied:

the terminal receives request information from the network device for requesting the terminal to report state information of a handover procedure; and a connection failure occurs in a handover (for example, CHO) procedure of the terminal.

The request information may request the terminal to report at least one of the following:

random access state information;

connection failure information; and

RLF information in the handover procedure.

Optionally, that a connection failure occurs in a handover procedure of the terminal may include at least one of the following:

the whole handover procedure fails, for example, the whole CHO procedure fails;

a timer for determining a handover failure expires, where the timer may be, for example, T304 or T304-like timers;

access to a candidate cell fails before a preset timer (for example, T304 or T304-like timers) expires; for example, the terminal made multiple attempts of handover to a plurality of candidate cells before the T304 expires, but none of the attempts leads to a successful connection to a candidate cell;

re-establishment fails before a preset timer (for example, T304 or T304-like timers) expires;

handover attempt(s) corresponding to one or a plurality of handover commands fail in the handover procedure;

handover attempt(s) corresponding to one or a plurality of target cells fail in the handover procedure;

one or a plurality of re-establishments fail in the handover procedure;

an RLF occurs in the handover procedure;

a re-establishment procedure is initiated after a handover failure or an RLF occurs, for example, in a re-establishment procedure, the terminal transmits indication information in a re-establishing complete message to indicate RLF or HOF information to be reported; and cell selection is performed after a handover failure or an RLF occurs. For example, a selected cell is one target cell of CHO, and then the terminal performs CHO. In the handover procedure, the terminal transmits indication information in a reconfiguration complete message to indicate RLF or HOF information to be reported.

Figure 2:
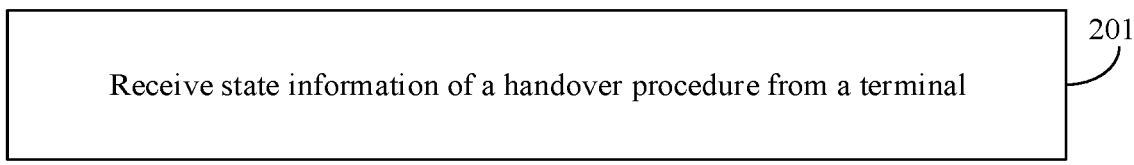
FIG. 2 is a flowchart of another method for reporting state information according to an embodiment of this disclosure.

Referring to FIG. 2, FIG. 2 is a flowchart of a method for reporting state information according to an embodiment of this disclosure. The method is applied to a network device. As shown in FIG. 2, the method includes the following steps:

Step 201: Receive state information of a handover procedure from a terminal.

The state information of a handover procedure may include at least one of the following:

random access procedure state information corresponding to a handover target cell of the handover procedure;

connection failure information corresponding to a handover target cell of the handover procedure; and RLF information in the handover procedure.

Optionally, the handover procedure is a conditional handover procedure.

It is not difficult to understand that compared with a reporting manner in conventional technology, using this embodiment of this disclosure, the terminal can effectively report the state information of a related handover procedure, meeting a configuration requirement of the network device even after the introduction of a handover procedure involving multiple attempts of handover to a plurality of candidate cells, so that the network device can optimize related configuration based on the information reported by the terminal.

Optionally, the random access procedure state information may include at least one of the following:

random access procedure failure information; and random access procedure success information.

Optionally, the random access procedure failure information may include at least one of the following:

a quantity of one or a plurality of handover attempts;

a quantity of one or a plurality of handover failures;

a quantity of handover attempts corresponding to a final successful access in one or a plurality of handover attempts;

a quantity of one or a plurality of re-establishment attempts;

a quantity of one or a plurality of re-establishment failures;

a quantity of re-establishment attempts corresponding to a final successful access in one or a plurality of re-establishment attempts;

a quantity of a plurality of handover attempts and re-establishment attempts;

a quantity of a plurality of handover failures and re-establishment failures;

a quantity of handover attempts or re-establishment attempts corresponding to a final successful access in a plurality of handover attempts or re-establishment attempts;

target information corresponding to one or a plurality of handover failures;

target information corresponding to one or a plurality of re-establishment failures;

a quantity of selections of handover to a candidate cell in one or a plurality of re-establishments;

at least one of a measurement result, a cell identity, a cell group identity, and a frequency identity that correspond to each selection of handover to a candidate cell in one or a plurality of re-establishments;

time related information; and location related information.

Optionally, the target information may include at least one of the following:

a measurement result, where the measurement result is a measurement result of at least one of a local cell, a candidate cell, and a neighboring cell;

at least one of a cell identity, a cell group identity, and a frequency identity; and a random access contention detection result.

Optionally, the measurement result is any one of the following:

a measurement result at triggering a handover; and a measurement result at satisfaction of a trigger condition for determining a handover failure.

Optionally, the random access procedure failure information includes at least one of the following:

a trigger condition corresponding to one or a plurality of handover failures;

a trigger condition index corresponding to one or a plurality of handover failures;

a trigger condition corresponding to one or a plurality of re-establishment failures; and a trigger condition index corresponding to one or a plurality of re-establishment failures.

Optionally, the success information of a random access procedure may include at least one of the following:

a quantity of transmissions of a preamble of a final successful random access procedure;

a contention detection result of a final successful random access;

at least one of a trigger condition, a measurement result, a cell identity, a cell group identity, and a frequency identity that correspond to a successful handover;

at least one of a trigger condition, a measurement result, a cell identity, a cell group identity, and a frequency identity that correspond to a successful re-establishment;

a quantity of a plurality of handover attempts before a successful random access;

a quantity of a plurality of re-establishment attempts before a successful random access;

a quantity of a plurality of handover attempts and re-establishment attempts before a successful random access;

at least one of a trigger condition, a measurement result, a cell identity, a cell group identity, and a frequency identity that correspond to each handover attempt before a successful random access; and at least one of a measurement result, a cell identity, a cell group identity, and a frequency identity that correspond to each re-establishment attempt before a successful random access.

Optionally, the connection failure information may include at least one of the following:

RLF information, handover failure information, and re-establishment failure information.

Optionally, the RLF information may include at least one of the following:

handover stage information corresponding to an RLF;

a measurement result, where the measurement result is a measurement result of at least one of a local cell, a candidate cell, and a neighboring cell; and at least one of a cell identity, a cell group identity, and a frequency identity corresponding to an RLF.

Optionally, in a case that the state information of a handover procedure includes a trigger condition, the state information of a handover procedure may further include:

effective range information corresponding to the trigger condition.

Optionally, in a case that the terminal has a connection failure, the state information of a handover procedure may further include:

connection failure timing information, where the connection failure timing information includes any one of the following:

duration from start of execution of a target handover command to failure of establishing a connection to a target cell corresponding to the target handover command;

duration from triggering a handover procedure for the first time to failure of establishing a connection to a target cell corresponding to a target handover command; and duration from receipt of a target handover command to failure of establishing a connection to a target cell corresponding to the target handover command.

Optionally, the target handover command is any one of the following:

the first triggered handover command;

a handover command corresponding to a candidate cell for a current handover or re-establishment;

a handover command corresponding to a last candidate cell for handover or re-establishment before a successful handover to a candidate cell; and a handover command corresponding to a last candidate cell for handover or re-establishment before a successful re-establishment to a candidate cell or another cell.

Optionally, before the step 201, the method further includes:

transmitting request information to the terminal, where the request information requests the terminal to report state information of a handover procedure.

Optionally, the request information requests the terminal to report at least one of the following:

random access state information;

connection failure information; and

RLF information in the handover procedure.

The foregoing embodiment describes the method for reporting state information in this disclosure, and the following describes a terminal and a network device in this disclosure with reference to the embodiments and drawings.

Figure 3:
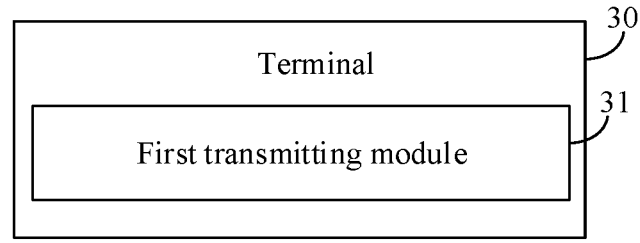
FIG. 3 is a first schematic structural diagram of a terminal according to an embodiment of this disclosure.

Referring to FIG. 3, FIG. 3 is a schematic structural diagram of a terminal according to an embodiment of this disclosure. As shown in FIG. 3, the terminal 30 includes:
- a first transmitting module 31, configured to transmit state information of a handover procedure to a network device, where
- the state information of a handover procedure includes at least one of the following:
- random access procedure state information corresponding to a handover target cell of the handover procedure;
- connection failure information corresponding to a handover target cell of the handover procedure; and
- RLF information in the handover procedure.

It is not difficult to understand that compared with a reporting manner in conventional technology, using this embodiment of this disclosure, the terminal can effectively report the state information of a related handover procedure, meeting a configuration requirement of the network device even after the introduction of a handover procedure involving multiple attempts of handover to a plurality of candidate cells, so that the network device can optimize related configuration based on the information reported by the terminal.

Optionally, the handover procedure is a conditional handover procedure.

It can be understood that for content included in the random access procedure state information, the connection failure information, and the RLF information, reference may be made to the description of the foregoing embodiment in FIG. 1. Details are not described herein again.

Optionally, in a case that the state information of a handover procedure includes a trigger condition, the state information of a handover procedure further includes:
- effective range information corresponding to the trigger condition.

Optionally, in a case that the terminal has a connection failure, the state information of a handover procedure further includes: connection failure timing information.

For content included in the connection failure timing information, reference may be made to the description of the foregoing embodiment in FIG. 1. Details are not described herein again.

Optionally, the first transmitting module 31 is specifically configured to:
- transmitting the state information of a handover procedure to the network device in a case that any one of the following is satisfied:
- the terminal receives request information from the network device for requesting the terminal to report state information of a handover procedure; and
- a connection failure occurs in a handover procedure of the terminal.

For the request information and the connection failure occurring in a handover procedure of the terminal, reference may be made to the description of the foregoing embodiment in FIG. 1. Details are not described herein again.

Figure 4:
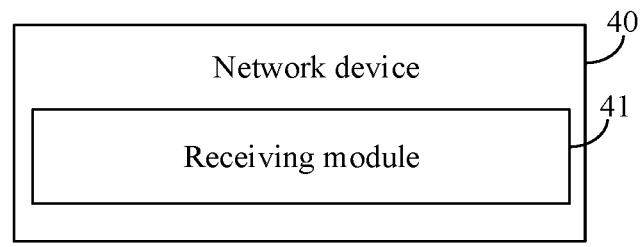
FIG. 4 is a first schematic structural diagram of a network device according to an embodiment of this disclosure.

Referring to FIG. 4, FIG. 4 is a schematic structural diagram of a network device according to an embodiment of this disclosure. As shown in FIG. 4, the network device 40 includes:
- a receiving module 41, configured to receive state information of a handover procedure from a terminal, where
- the state information of a handover procedure includes at least one of the following:
- random access procedure state information corresponding to a handover target cell of the handover procedure;
- connection failure information corresponding to a handover target cell of the handover procedure; and
- RLF information in the handover procedure.

It is not difficult to understand that compared with a reporting manner in conventional technology, using this embodiment of this disclosure, the terminal can effectively report the state information of a related handover procedure, meeting a configuration requirement of the network device even after the introduction of a handover procedure involving multiple attempts of handover to a plurality of candidate cells, so that the network device can optimize related configuration based on the information reported by the terminal.

Optionally, the handover procedure is a conditional handover procedure.

It can be understood that for content included in the random access procedure state information, the connection failure information, and the RLF information, reference may be made to the description of the foregoing embodiment in FIG. 1. Details are not described herein again.

Optionally, in a case that the state information of a handover procedure includes a trigger condition, the state information of a handover procedure may further include:
- effective range information corresponding to the trigger condition.

Optionally, in a case that the terminal has a connection failure, the state information of a handover procedure may further include:
- connection failure timing information.

For content included in the connection failure timing information, reference may be made to the description of the foregoing embodiment in FIG. 1. Details are not described herein again.

Optionally, the network device 40 further includes:
- a second transmitting module, configured to send request information to the terminal, where
- the request information requests the terminal to report state information of a handover procedure.

Optionally, the request information requests the terminal to report at least one of the following:
- random access state information;
- connection failure information; and
- RLF information in the handover procedure.

An embodiment of this disclosure further provides a communications device, including a processor, a memory, and a computer program stored in the memory and capable of running on the processor. When the computer program is executed by the processor, the processes of the embodiments of the foregoing method for reporting state information shown in FIG. 1 or FIG. 2 are implemented, with the same technical effects achieved. To avoid repetition, details are not described herein again. The communications device is optionally a terminal or a network device.

Figure 5:
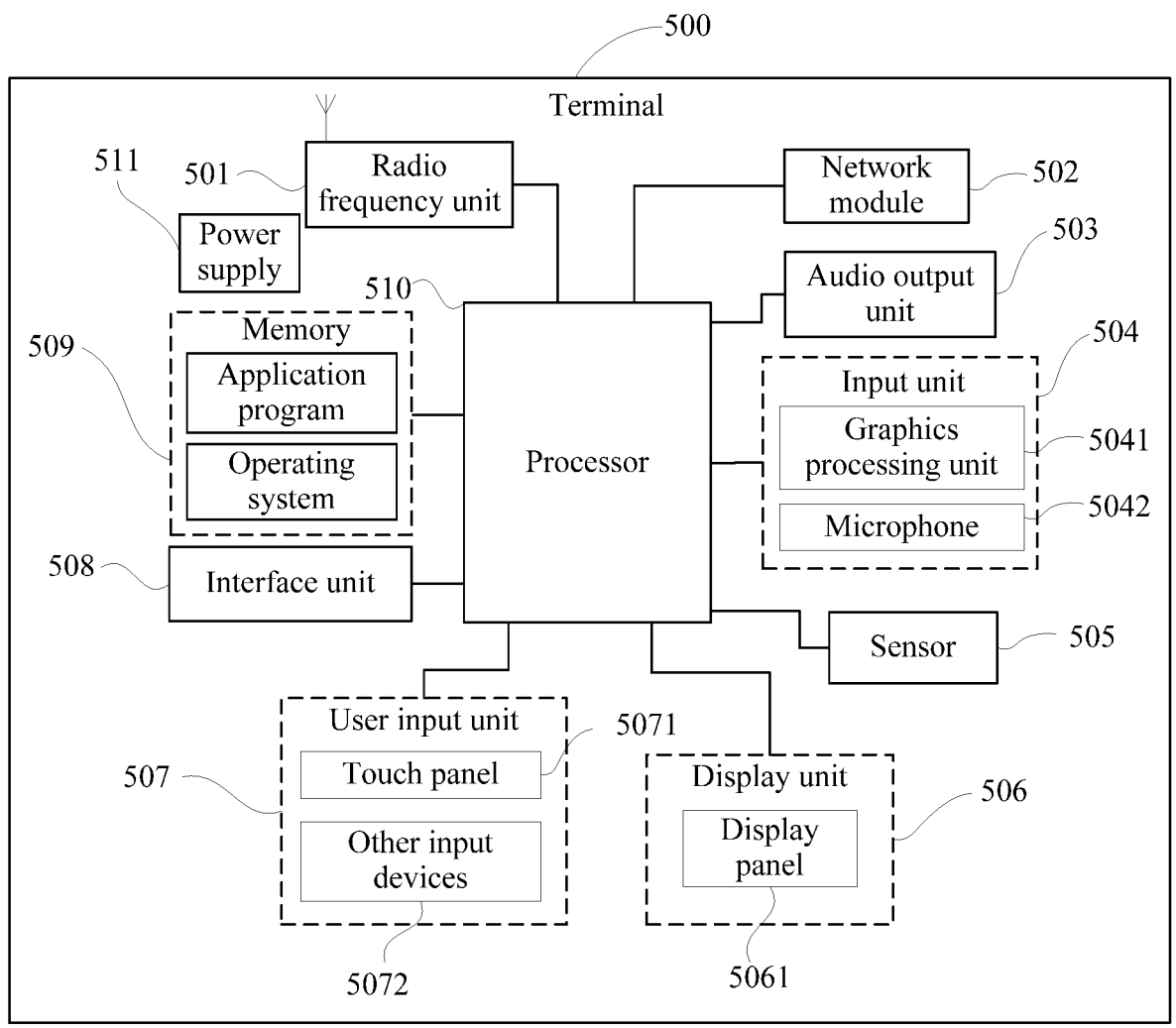
FIG. 5 is a second schematic structural diagram of a terminal according to an embodiment of the present disclosure.

Referring to FIG. 5, FIG. 5 is a schematic diagram of a hardware structure of a terminal for implementing the embodiments of this disclosure. The terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the structure of the terminal shown in FIG. 5 does not constitute any limitation on the terminal. The terminal may include more or fewer components than those shown in the figure, or combine some of the components, or arrange the components differently. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 501 is configured to transmit state information of a handover procedure to a network device, where the state information of a handover procedure may include at least one of the following:

random access procedure state information corresponding to a handover target cell of the handover procedure;

connection failure information corresponding to a handover target cell of the handover procedure; and RLF information in the handover procedure.

The terminal 500 in this embodiment of this disclosure can implement the processes of the method embodiment in FIG. 1, with the same beneficial effects achieved. To avoid repetition, details are not described herein again.

It should be understood that, in this embodiment of this disclosure, the radio frequency unit 501 may be configured to transmit or receive a signal in an information transmitting/receiving or call process. Specifically, the radio frequency unit 501 receives downlink data from a base station and transmits the downlink data to the processor 510 for processing; and transmits uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with a network and other devices through a wireless communications system.

The terminal provides wireless broadband internet access for a user by using the network module 502, for example, helping the user send and receive e-mails, browse web pages, and access streaming media.

The audio output unit 503 may convert audio data received by the radio frequency unit 501 or the network module 502 or stored in the memory 509 into an audio signal and output the audio signal as a sound. In addition, the audio output unit 503 may further provide audio output (for example, a call signal received tone or a message received tone) that is related to a specific function performed by the terminal 500. The audio output unit 503 includes a speaker, a buzzer, a receiver, and the like.

The input unit 504 is configured to receive an audio or video signal. The input unit 504 may include a graphics processing unit (GPU) 5041 and a microphone 5042, and the graphics processing unit 5041 processes image data of a still picture or a video obtained by an image capture apparatus (for example, a camera) in an image capture mode or a video capture mode. A processed image frame may be displayed on the display unit 506. The image frame processed by the graphics processing unit 5041 may be stored in the memory 509 (or another storage medium) or transmitted by using the radio frequency unit 501 or the network module 502. The microphone 5042 is capable of receiving sounds and processing such sounds into audio data. The processed audio data may be converted in a telephone call mode into a format that can be transmitted by the radio frequency unit 501 to a mobile communications base station, for outputting.

The terminal 500 further includes at least one sensor 505, for example, an optical sensor, a motion sensor, and other sensors. Specifically, the optical sensor may include an ambient light sensor and a proximity sensor. The ambient light sensor may adjust luminance of the display panel 5061 based on brightness of ambient light, and the proximity sensor may turn off a display panel 5061 and/or backlight when the terminal 500 moves close to an ear. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as pedometer and tapping), and the like. The sensor 505 may also include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided for the user. The display unit 506 may include the display panel 5061. The display panel 5061 may be configured in a form of a liquid crystal display (LCD), an organic light-emitting diode (OLED), or the like.

The user input unit 507 may be configured to receive input digit or character information, and generate key signal input that is related to user setting and function control of the terminal. Specifically, the user input unit 507 includes a touch panel 5071 and other input devices 5072. The touch panel 5071, also referred to as a touchscreen, can collect a touch operation of the user on or near the touch panel 5071 (for example, an operation performed by the user on the touch panel 5071 or near the touch panel 5071 by using a finger or any applicable object or accessory such as a stylus). The touch panel 5071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 510, and receives and executes a command transmitted by the processor 510. In addition, the touch panel 5071 may be implemented in a plurality of forms, for example, as a resistive, capacitive, infrared, or surface acoustic wave touch panel. In addition to the touch panel 5071, the user input unit 507 may further include other input devices 5072. Specifically, the other input devices 5072 may include but are not limited to a physical keyboard, a function key (for example, a volume control key or a power on/off key), a trackball, a mouse, and a joystick. Details are not described herein.

Further, the touch panel 5071 may cover the display panel 5061. When detecting a touch operation on or near the touch panel 5071, the touch panel 5071 transmits the touch operation to the processor 510 for determining a type of the touch event. Then, the processor 510 provides a corresponding visual output on the display panel 5061 based on the type of the touch event. Although in FIG. 5, the touch panel 5071 and the display panel 5061 act as two separate parts to implement input and output functions of the terminal, in some embodiments, the touch panel 5071 and the display panel 5061 may be integrated to implement the input and output functions of the terminal. This is not specifically limited herein.

The interface unit 508 is an interface for connecting an external apparatus to the terminal 500. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, or an earphone port. The interface unit 508 may be configured to receive input (for example, data information or electric power) from the external apparatus, and transmit the received input to one or more elements in the terminal 500; or may be configured to transmit data between the terminal 500 and the external apparatus.

The memory 509 may be configured to store software programs and various data. The memory 509 may mainly include a program storage region and a data storage region. The program storage region may store an operating system, an application required by at least one function (for example, an audio play function or an image play function), and the like. The data storage region may store data (for example, audio data and a phone book) created based on usage of the mobile phone. In addition, the memory 509 may include a high-speed random access memory, and may further include a nonvolatile memory, for example, at least one magnetic disk storage device, flash memory device, or other nonvolatile solid-state storage device.

The processor 510 is a control center of the terminal, which is connected to all components of the terminal by using various interfaces and lines. By running or executing software programs and/or modules stored in the memory 509 and invoking data stored in the memory 509, the processor 510 executes various functions of the terminal and processes data, so as to perform overall monitoring on the terminal. The processor 510 may include one or more processing units. Optionally, the processor 510 may integrate an application processor and a modem processor. The application processor mainly processes an operating system, a user interface, an application program, and the like. The modem processor mainly processes wireless communication. It can be understood that the modem processor may alternatively not be integrated in the processor 510.

The terminal 500 may further include a power supply 511 (for example, a battery) that supplies power to the components. Optionally, the power supply 511 may be logically connected to the processor 510 through a power management system, so as to implement functions such as charging management, discharging management, and power consumption management through the power management system.

In addition, the terminal 500 may further include some functional modules that are not shown. Details are not described herein.

Figure 6:
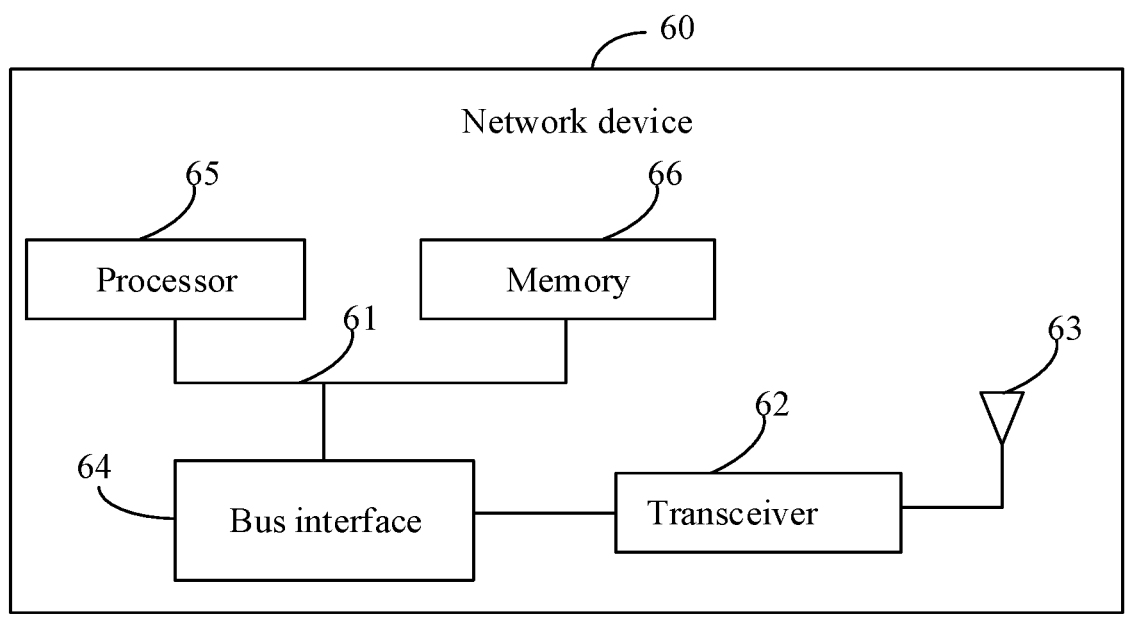
FIG. 6 is a second schematic structural diagram of a network device according to an embodiment of this disclosure.

Referring to FIG. 6, FIG. 6 is a schematic diagram of a hardware structure of a network device for implementing the embodiments of this disclosure. The network device 60 includes but is not limited to a bus 61, a transceiver 62, an antenna 63, a bus interface 64, a processor 65, and a memory 66.

In this embodiment of this disclosure, the network device 60 further includes a computer program stored in the memory 66 and capable of running on the processor 65. Optionally, when the computer program is executed by the processor 65, the following steps are implemented:

receiving state information of a handover procedure from a terminal, where
the state information of a handover procedure includes at least one of the following:
random access procedure state information corresponding to a handover target cell of the handover procedure;
connection failure information corresponding to a handover target cell of the handover procedure; and
RLF information in the handover procedure.

The transceiver 62 is configured to transmit and receive data under control of the processor 65.

The network device 60 in this embodiment of this disclosure can implement the processes of the method embodiment in FIG. 2, with the same beneficial effects achieved. To avoid repetition, details are not described herein again.

In FIG. 6, in a bus architecture (represented by the bus 61), the bus 61 may include any quantity of interconnected buses and bridges, and the bus 61 connects various circuits that include one or more processors represented by the processor 65 and a memory represented by the memory 66. The bus 61 may further connect various other circuits, such as a peripheral device, a voltage regulator, and a power management circuit. These are common sense in the art, and therefore are not further described in this specification. The bus interface 64 provides an interface between the bus 61 and the transceiver 62. The transceiver 62 may be one element, or may be a plurality of elements, for example, a plurality of receivers and transmitters, and provides a unit for communicating with various other apparatuses on a transmission medium. Data processed by the processor 65 is transmitted on a wireless medium through the antenna 63. Further, the antenna 63 receives data and transmits the data to the processor 65.

The processor 65 is responsible for managing the bus 61 and general processing, and may further provide various functions, including timing, a peripheral interface, voltage regulation, power management, and other control functions. The memory 66 may be configured to store data for use by the processor 65 when the processor 65 performs an operation.

Optionally, the processor 65 may be a CPU, an ASIC, an FPGA, or a CPLD.

An embodiment of this disclosure further provides a computer-readable storage medium, where the computer-readable storage medium stores a computer program, and when the computer program is executed by a processor, the processes of the method for reporting state information described above with reference to FIG. 1 or FIG. 2 may be implemented, and the same technical effect can be achieved. Therefore, details are not described here again to avoid repetition. The computer-readable storage medium may be a read-only memory (ROM), a random access memory (RAM), a magnetic disk, an optical disc, or the like.

It should be noted that, in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. Without more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In many cases, the former is a preferred implementation. Based on such an understanding, the technical solutions of this disclosure essentially or the part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementations. The foregoing specific implementations are merely illustrative rather than restrictive. Inspired by this disclosure, persons of ordinary skill in the art may develop many other implementations without departing from principle of this disclosure and the protection scope of the claims, and all such implementations shall fall within the protection scope of this disclosure.

What is claimed is:

1. A method for reporting state information, applied to a terminal and comprising:
   transmitting state information of a handover procedure to a network device, wherein
   the state information of a handover procedure comprises at least one of the following:
   random access procedure state information corresponding to a handover target cell of the handover procedure;
   connection failure information corresponding to a handover target cell of the handover procedure; and
   radio link failure RLF information in the handover procedure;
   wherein the random access procedure state information comprises random access procedure failure information;
   the random access procedure failure information comprises at least one of the following:
   target information corresponding to one or a plurality of re-establishment failures;
   a quantity of selections of handover to a candidate cell in one or a plurality of re-establishments; and
   at least one of a measurement result, a cell identity, a cell group identity, and a frequency identity that correspond to each selection of handover to a candidate cell in one or a plurality of re-establishments;
   wherein the target information comprises: a random access contention detection result;
   wherein the handover procedure is a conditional handover procedure.

2. The method according to claim 1, wherein the random access procedure state information further comprises:
   random access procedure success information.

3. The method according to claim 2, wherein the random access procedure failure information further comprises at least one of the following:
   a quantity of one or a plurality of handover attempts;
   a quantity of one or a plurality of handover failures;
   a quantity of handover attempts corresponding to a final successful access in one or a plurality of handover attempts;
   a quantity of one or a plurality of re-establishment attempts;
   a quantity of one or a plurality of re-establishment failures;
   a quantity of re-establishment attempts corresponding to a final successful access in one or a plurality of re-establishment attempts;
   a quantity of a plurality of handover attempts and re-establishment attempts;
   a quantity of a plurality of handover failures and re-establishment failures;
   a quantity of handover attempts or re-establishment attempts corresponding to a final successful access in a plurality of handover attempts or re-establishment attempts;
   target information corresponding to one or a plurality of handover failures;
   time related information; and
   location related information.

4. The method according to claim 3, wherein the target information comprises at least one of the following:
   a measurement result, wherein the measurement result is a measurement result of at least one of a local cell, a candidate cell, and a neighboring cell;
   at least one of a cell identity, a cell group identity, and a frequency identity.

5. The method according to claim 4, wherein the measurement result is any one of the following:
   a measurement result at triggering a handover; and
   a measurement result at satisfaction of a trigger condition for determining a handover failure.

6. The method according to claim 2, wherein the random access procedure failure information comprises at least one of the following:
   a trigger condition corresponding to one or a plurality of handover failures;
   a trigger condition index corresponding to one or a plurality of handover failures;
   a trigger condition corresponding to one or a plurality of re-establishment failures; and
   a trigger condition index corresponding to one or a plurality of re-establishment failures.

7. The method according to claim 6, wherein
   the one comprises any one of the following:
   only one attempt, any one attempt, and the last attempt before a successful access;
   and/or,
   the plurality comprises any one of the following:
   all handover and re-establishment attempts, all handover attempts, and all re-establishment attempts.

8. The method according to claim 6, wherein in a case that the state information of a handover procedure comprises the trigger condition, the state information of a handover procedure further comprises:
   effective range information corresponding to the trigger condition.

9. The method according to claim 2, wherein the random access procedure success information comprises at least one of the following:
   a quantity of transmissions of a preamble of a final successful random access procedure;
   a contention detection result of a final successful random access;
   at least one of a trigger condition, a measurement result, a cell identity, a cell group identity, and a frequency identity that correspond to a successful handover;
   at least one of a trigger condition, a measurement result, a cell identity, a cell group identity, and a frequency identity that correspond to a successful re-establishment;
   a quantity of a plurality of handover attempts before a successful random access;
   a quantity of a plurality of re-establishment attempts before a successful random access;
   a quantity of a plurality of handover attempts and re-establishment attempts before a successful random access;

at least one of a trigger condition, a measurement result, a cell identity, a cell group identity, and a frequency identity that correspond to each handover attempt before a successful random access; and at least one of a measurement result, a cell identity, a cell group identity, and a frequency identity that correspond to each re-establishment attempt before a successful random access.

10. The method according to claim 1, wherein the connection failure information comprises at least one of the following:
RLF information, handover failure information, and re-establishment failure information.

11. The method according to claim 1, wherein the RLF information comprises at least one of the following:
handover stage information corresponding to an RLF;
a measurement result, wherein the measurement result is a measurement result of at least one of a local cell, a candidate cell, and a neighboring cell; and
at least one of a cell identity, a cell group identity, and a frequency identity corresponding to an RLF.

12. The method according to claim 1, wherein in a case that the terminal has a connection failure, the state information of a handover procedure further comprises:
connection failure timing information, wherein
the connection failure timing information comprises any one of the following:
duration from start of execution of a target handover command to failure of establishing a connection to a target cell corresponding to the target handover command;
duration from triggering a handover procedure for the first time to failure of establishing a connection to a target cell corresponding to a target handover command; and
duration from receipt of a target handover command to failure of establishing a connection to a target cell corresponding to the target handover command.

13. The method according to claim 12, wherein the target handover command is any one of the following:
the first triggered handover command;
a handover command corresponding to a candidate cell for a current handover or re-establishment;
a handover command corresponding to a last candidate cell for handover or re-establishment before a successful handover to a candidate cell; and
a handover command corresponding to a last candidate cell for handover or re-establishment before a successful re-establishment to a candidate cell or another cell.

14. The method according to claim 1, wherein the transmitting state information of a handover procedure to the network device comprises:
transmitting the state information of a handover procedure to the network device in a case that any one of the following is satisfied:
the terminal receives request information from the network device for requesting the terminal to report state information of a handover procedure; and
a connection failure occurs in a handover procedure of the terminal.

15. The method according to claim 14, wherein the request information requests the terminal to report at least one of the following:
random access state information;
connection failure information; and
RLF information in the handover procedure.

16. The method according to claim 14, wherein that a connection failure occurs in a handover procedure of the terminal comprises at least one of the following:
the whole handover procedure fails;
a timer for determining a handover failure expires;
access to a candidate cell fails before a preset timer expires;
re-establishment fails before a preset timer expires;
handover attempt(s) corresponding to one or a plurality of handover commands fail in the handover procedure;
handover attempt(s) corresponding to one or a plurality of target cells fail in the handover procedure;
one or a plurality of re-establishments fail in the handover procedure;
an RLF occurs in the handover procedure;
a re-establishment procedure is initiated after a handover failure or an RLF occurs; and
cell selection is performed after a handover failure or an RLF occurs.

17. A method for reporting state information, applied to a network device and comprising:
receiving state information of a handover procedure from a terminal, wherein
the state information of a handover procedure comprises at least one of the following:
random access procedure state information corresponding to a handover target cell of the handover procedure;
connection failure information corresponding to a handover target cell of the handover procedure; and
RLF information in the handover procedure;
wherein the random access procedure state information comprises random access procedure failure information;
the random access procedure failure information comprises at least one of the following:
target information corresponding to one or a plurality of re-establishment failures;
a quantity of selections of handover to a candidate cell in one or a plurality of re-establishments; and
at least one of a measurement result, a cell identity, a cell group identity, and a frequency identity that correspond to each selection of handover to a candidate cell in one or a plurality of re-establishments;
wherein the target information comprises: a random access contention detection result;
the handover procedure is a conditional handover procedure.

18. A communications device, comprising: a memory, a processor, and a computer program that is stored in the memory and capable of running on the processor, wherein when the computer program is executed by the processor, the steps of the method for reporting state information are implemented, the method comprises:
transmitting state information of a handover procedure to a network device, wherein
the state information of a handover procedure comprises at least one of the following:
random access procedure state information corresponding to a handover target cell of the handover procedure;
connection failure information corresponding to a handover target cell of the handover procedure; and
radio link failure RLF information in the handover procedure;
wherein the random access procedure state information comprises random access procedure failure information;

the random access procedure failure information comprises at least one of the following:

target information corresponding to one or a plurality of re-establishment failures;

a quantity of selections of handover to a candidate cell in one or a plurality of re-establishments; and at least one of a measurement result, a cell identity, a cell group identity, and a frequency identity that correspond to each selection of handover to a candidate cell in one or a plurality of re-establishments;

wherein the target information comprises: a random access contention detection result;

the handover procedure is a conditional handover procedure.

* * * * *